INVENTORS
Rogers B. Downey
and
Allyn M. Silverman
Brown and Mikulka
ATTORNEYS

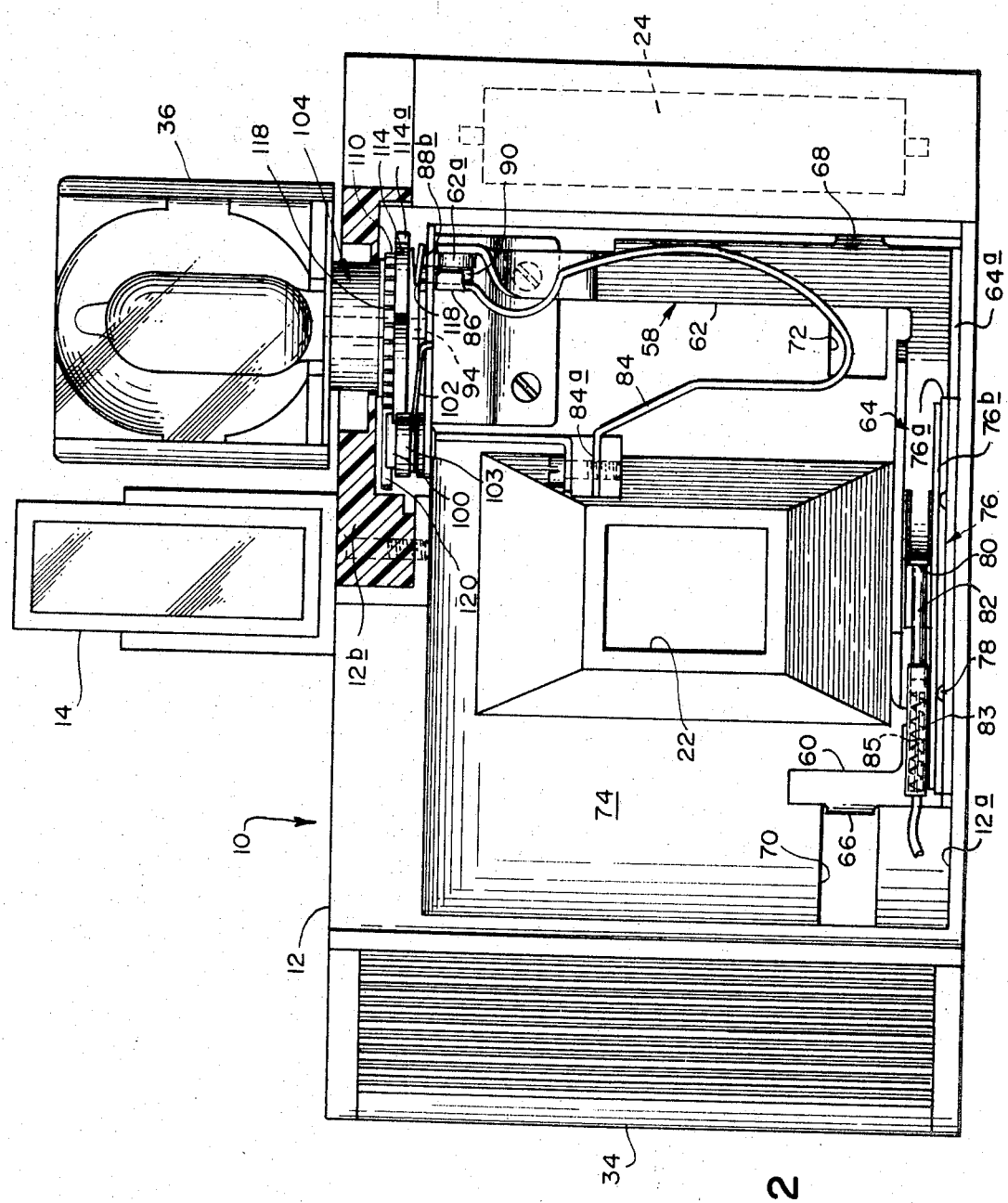

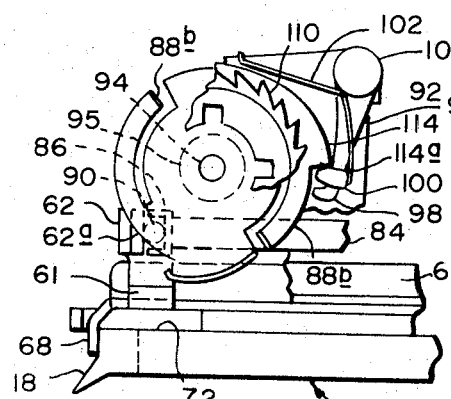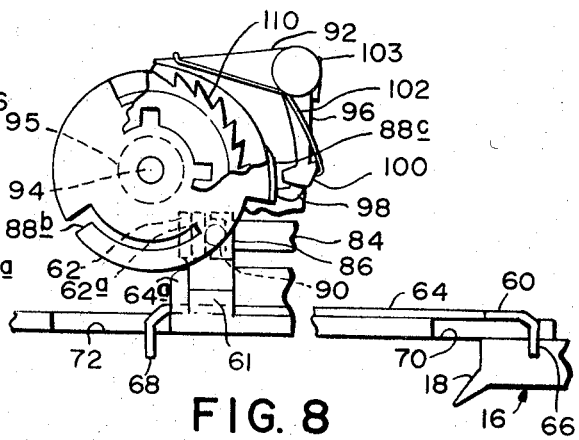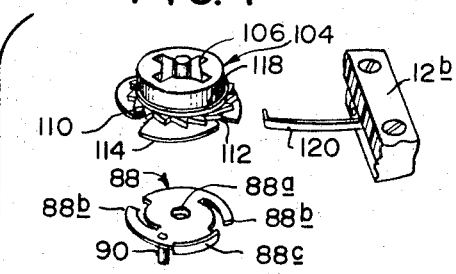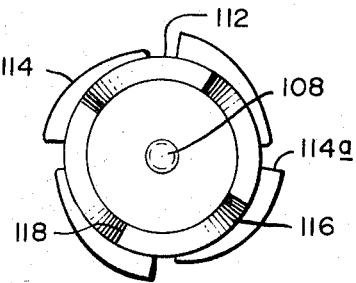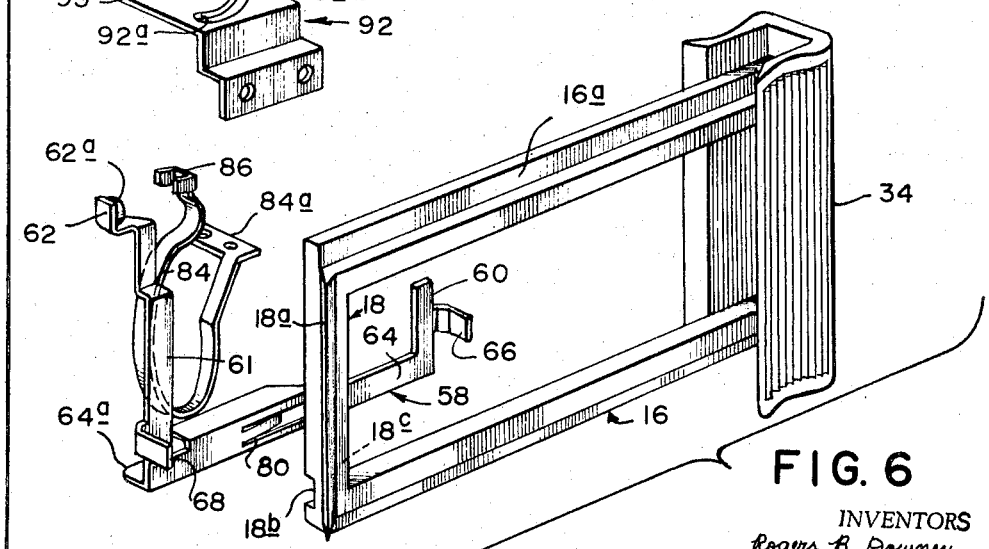

3,437,023
CAMERA APPARATUS
Rogers B. Downey, Lexington, and Allyn M. Silverman, Boston, Mass., assignors to Polaroid Corporation, Cambridge, Mass., a corporation of Delaware
Filed Dec. 22, 1966, Ser. No. 604,052
Int. Cl. G03b 17/52
U.S. Cl. 95—13       6 Claims This invention relates to apparatus for incorporation with a camera to perform certain operations contributing to the photographic exposure of a film assembly at a focal plane thereof and to process the film assembly after its exposure.

A film assembly of a type suitable for use with the apparatus of the present invention includes photosensitive and image-providing components and a releasably-contained processing liquid. It is of a multilayer structure such that after exposure, release of the liquid by the application of a compressive force, as by a pair of pressure rolls, to a liquid-containing element of the assembly, spreading of the liquid and imbibition thereof into predetermined layers, including an exposed silver halide emulsion layer, provide a visible image. The image is formed by the diffusion transfer of the image-forming substances to a designated image-receiving surface. Such a process is associated with cameras and film materials sold by Polaroid Corporation, Cambridge, Mass., U.S.A. Processing is initiated by moving the film assembly between compressive means and involves mechanical transport means operating according to a predetermined program. A processing liquid suitable for use in forming the image may comprise an aqueous solution of a silver halide developer such as hydroquinone, a silver halide solvent of the type of sodium thiosulfate, and an alkaline substance such as sodium hydroxide. It may also preferably include a thickening or film-forming agent such as a synthetic polymer of the type of sodium carboxy-methyl cellulose and, possibly, a high-molecular-weight polymeric mordant to facilitates the transfer process. In producing a black-and-white image, a latent image is developed; the exposed silver halide is reduced to silver, and the unreduced silver halide forms a soluble silver complex which is transferred from undeveloped areas to the image-receiving surface, the image being formed on the latter in silver. In the production of a color transparency, substances capable of forming dye images at the image-receiving surface such as dyes, color couplers, or the like, may be employed in the transfer proces. Or, a black-and-white image in conjunction with a color screen may, advantageously, be employed to provide an image visible substantially in full color.

Cameras of a generally related category adapted to process film materials of the type above described, of a miniature format, are set forth in U.S. Patent 3,225,670 and in the copending patent applications Ser. No. 448,630, filed Apr. 16, 1965 under the names of Patrick L. Finelli and Herbert A. Bing for Camera Apparatus and, more particularly, Ser. No. 516,416 filed Dec. 27, 1965 under the name of Rogers B. Downey for Camera Apparatus. In the aforesaid cameras, the processing mechanism performs only the function of advancing and compressing each film assembly to effect its processing. The apparatus of the present invention enables, in addition thereto, the performance of certain functions principally relating to the exposure of the film assembly. These comprise the operation of a so-called "flash-cube" and may, for example, also include the tensioning of a shutter actuating means and the operation of a film counter.

Objects of the invention are, therefore, to provide apparatus for incorporation with complementary means of a camera to effect certain operations relating to the photographic exposure of a film assembly; to provide apparatus of the character described wherein the camera is of a type comprising means for processing the film assembly and wherein the apparatus includes means interlocking therewith to effect the aforesaid exposure operations; to provide apparatus, as defined which is responsive to an inward and outward movement of a manually-actuated plunger-type element mounted on the camera, which movement encompasses all of the above-described functions; and to provide apparatus of the category stated which is of trouble-free structure and positive in action.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is a diagrammatic front view of the camera, partly in section and with parts broken away;

FIG. 6 is a diagrammatic exploded view of the apparatus;

FIGS. 7 and 8 are diagrammatic plan views of mechanism of the invention for providing a step-wise rotation of a flash-cube, a rear-to-front location of parts being that shown, proceeding in a direction toward the top of the sheet; and FIG. 9 is a bottom view of the flash-cube socket element.

Figure 1:
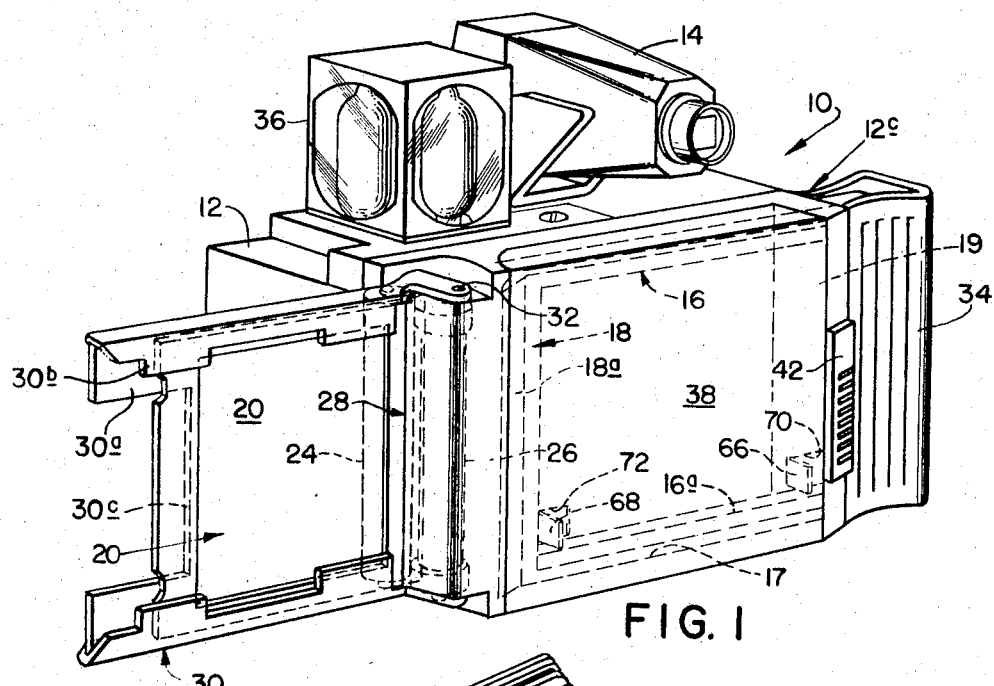
FIGURE 1 is a diagrammatic rear view of a miniature camera embodying apparatus of the present invention.

Referring now to the drawings, a miniature camera 10 incorporating the apparatus of the present invention is shown from the rear in FIG. 1 and from the front, with portions including a front wall which is to be assumed as mounting a lens-and-shutter assembly, broken away in FIG. 2. The camera comprises a housing 12 composed of a metal such as aluminum or a suitable plastic, a viewfinder 14 and certain elements specifically identified with the processing of a film assembly of the general character previously described. More particularly, the film assembly is of a type which, after its processing, assumes the form of a fully-mounted transparency or slide, ready for direct viewing or projection, when it is removed from the camera. A plastic material appropriate for forming the camera housing may, for example, be that known as "Delrin" sold by E. I. du Pont de Nemours Co., Wilmington, Del., U.S.A. Another plastic suitable for the purpose is "Acrylafil," sold by Fiberfil, Inc., Evansville, Ind., U.S.A.

The processing elements essentially include a frame-like, "pusher-type" film-assembly advancing means 16 mounted for slidable horizontal movement and having a transverse leading bar component 18 for contacting the trailing edge 20a of each film assembly 20 and propelling the latter after its exposure from a focal plane aligned with the lens aperture at 22, between a pair of pressure rolls 24 and 26, through an exit aperture or slot at 28 formed in the camera housing, and into a semi-enclosing processing chamber 30. The processing chamber is pivotally mounted at 32 and folds rearwardly against the back of the camera when not in use. The film-advancing means 16 is manually actuated by a handle 34 affixed to an end thereof which extends slidably through correspondingly formed apertures at one end of the camera housing opposite to that in which is formed the exit slot 28. A standard flash-cube unit 36, including the usual flash-bulb, reflector and protective cover, is shown mounted on the camera, its rotation in steps of 90° accompanying actuation of the film-advancing means 16.

A plurality of the film assemblies 20, in the form of a film pack, is contained in a magazine 38. They are impelled forwardly or toward the substantially open face 38a of the magazine by suitable biasing means within the magazine, not shown. Each foremost film assembly of the film pack, that is, the film assembly nearest the open face of the magazine, is adapted to be slidably removed from the magazine along the guide flanges or channels 40. The magazine 38, containing the film pack, is releasably mounted on the back of the camera to then constitute an integral part thereof, the latch being subject to release by actuation of the slidable button 42. With the magazine thus mounted, as shown in FIG. 1, it is to be understood that the foremost film assembly, prior to its advancement, is positioned at the focal plane of the camera, in readiness for a photographic exposure. Thereafter, the film assembly is adapted to be slidably advanced by the "pusher-type" means 16 in the manner above described.

Figure 3:
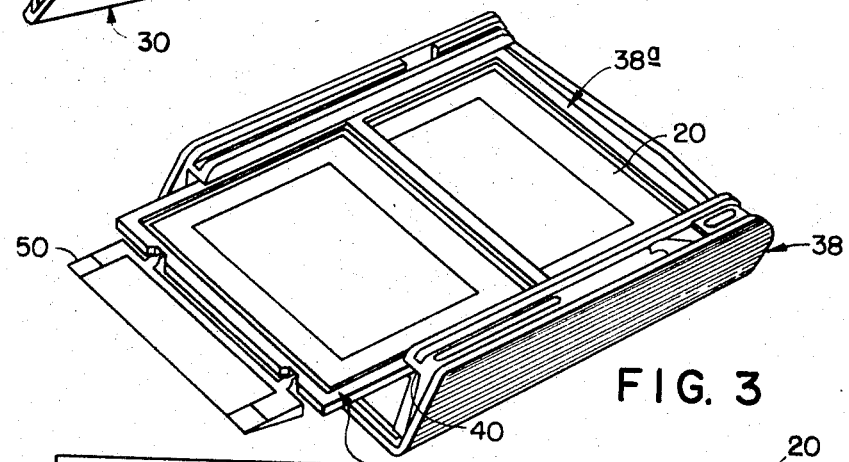
FIG. 3 is a diagrammatic perspective view of a magazine and film pack employed in conjunction with apparatus of the invention.
Figures 4, 5:
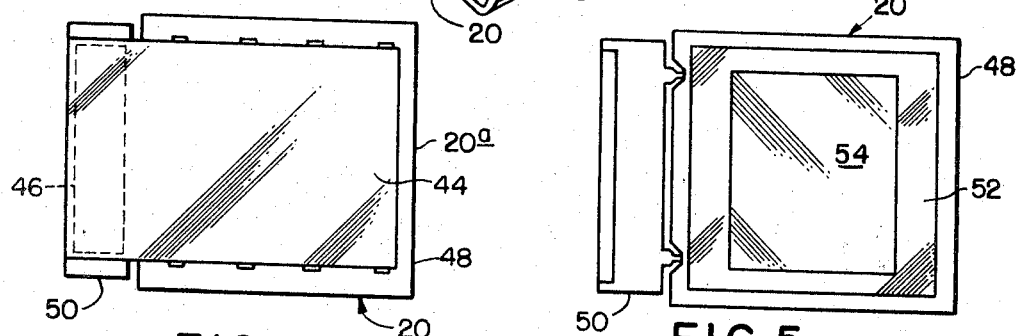
FIGS. 4 and 5 are diagrammatic rear and front views, respectively, of a film assembly used in conjunction with apparatus of the invention.

The film assembly 20 is shown from the front in FIGS. 3 and 5 and from the rear in FIG. 4. The terms "front" and "rear" or their equivalents, as used herein, refer to the relative nearness or remoteness of the parts or elements mentioned to the front of the camera, as or when associated therewith. When advanced through the slot 28, the open front of the film assembly, through which light of the photographic exposure has entered, is positioned against the opaque surface or base 30a of the processing chamber and thus is protected against any incidence of ambient light which would prove damaging during the final seconds of the processing operation. Its rear surface is protected by a cover sheet 44 which, after processing has been completed, is manually removed. The film assembly also includes a processing liquid releasably-confined in a compressible container 46, a rigid or semi-rigid plastic mount 48 including a separable "break-off" tab 50, a masking or framing element 52 and a composite film component 54 which includes, as a layer component thereof, a photosensitive silver-halide emulsion, means providing an image-receiving layer and such other components, previously described, as may be required to produce by diffusion transfer the completed transparency. When the film assembly 20 is advanced between the pressure rolls 24 and 26, the processing liquid is released and spread at least throughout the emulsion. After remaining in the processing chamber 30 for a period of a few seconds, held by the retaining flanges 30b, the liquid permeates the emulsion, diffusion transfer of image-forming substances to the internal image-receiving layer occurs and the photographic image in black-and-white or in full color, depending upon the image-producing photographic characteristics of the film component 54, is produced at the image-receiving layer. The tab 50 is then manually grasped and broken off, and the exhausted container 46, emulsion layer of the film component 54, and cover sheet 44 are stripped away therewith as a unit. The finished mounted transparency remains in the chamber 30, held by the flanges 30b as shown in FIG. 1. It can easily be removed by grasping it in the cut-away portion 30c of the chamber.

The film-advancing means 16 is mounted for slidable linear movent in the camera, its longitudinal flanged elements 16a being inserted within channeled portions 17 of the camera for the purpose. The extent of its travel in a direction toward the pressure rolls 24 and 26 is limited by contact of the handle 34 with the exterior of the camera housing at 12c. Its movement in an opposite direction is limited by contact of the cross-bar 18 with an inner wall or partition 19 of the camera. The cross-bar 18, and more particularly the angularly-projecting portion 18a thereof, serves to propel each film assembly from the focal plane to the pressure rolls 24 and 26 and thence to the processing chamber 30. Additionally, the film-advancing means 16 embodies two functional surface portions 18b and 18c for actuating a modified L-shaped intermediate driving or actuating element 58 interlocking with other mechanism of the camera to be described. The element 58 is formed from a sheet metal and is composed of a plurality of unitary arms and angularly-projecting lugs or tangs. As shown in FIGS. 2 and 6, it comprises the vertically-disposed arm members 60 and 62 and the longitudinal or horizontal interconnecting arm member 64. The arms 60 and 62 include, respectively, the rearlardly projecting tangs 66 and 68 which are subject to contact by the surface portions 18c and 18b of the cross-member or bar 18 and serve therewith to provide movement of the element 58 in response to movement of the film-advancing means 16. A pair of elongated slots 70 and 72 is formed within an internal web 74 of the camera. The tangs 66 and 68 protrude rearwardly through, and are permitted freedom of longitudinal movement within these slots.

The driving element 58 is mounted for slidable linear movement back-and-forth in the suitable guide means of the camera responsive to similar movement of the film-advancing means 16, but in much shorter strokes because contact with the tangs occurs nearly at the end of travel of the advancing means 16 in either direction. Assuming the camera to be positioned as shown in FIGS. 1 and 2, horizontal linear movement of the driving element 58 is guided by a flange-like member 64a, integral with and extending forwardly at 90° from the member 64, which is slidably engaged by a guide plate 76, having a raised or channeled portion 76a formed therein and an upturned edge portion 76b. The plate 76 is fastened by retaining screws or rivets 78 to the lower wall 12a of the camera housing. The flange-like member 64a is adapted to undergo a controlled slidable movement within the indented or channeled portion 76a while the upturned portion 76b bears slidably against the arm 64. The rear surfaces of the arm members 60, 62 and 64 are in slidable contact with the web 74, the latter preferably being composed of a plastic such as that previously mentioned in conjunction with the camera housing. This contributes to a positive seating of the driving element 58 and takes advantage of the slidable property of a metal in contact with a plastic of the character previously described.

The driving element 58, when moved by the film-advancing means 16, in the manner above described, directly actuates elements of the camera relating to the photographic exposure of the film assemblies 20. This is accomplished through the instrumentality of the tang 80 and the arm 62 of the driving element. The tang 80 engages the plunger actuating means 82 of a shutter-tensioning or cocking mechanism including the cylinder and biasing spring 83 and means 85 leading to the shutter, other elements of the shutter mechanism being conventional and not illustrated in detail. The length of travel of the plunger 82 is predetermined with respect to that of the driving element 58 and film-assembly advancing means 16 whereby the shutter is not tensioned until the surface 18a of the advancing means has contacted the trailing edge of a film assembly at the focal plane, thus preventing a double-exposure of a film assembly. The arm 62, through the medium of a smooth-surfaced contact piece 62a at its extremity, initiates a series of operations which provide rotation of a standard flash-cube 36 in steps or quadrants of 90°. As an accompaniment of the aforesaid operations, each of the four flash-bulbs of the flash-cube unit is brought into operative position during the advancement of a film assembly between the pressure rolls 24 and 26. Electrical energization of each flash-bulb will be understood as occurring through the closing of shutter contacts in a conventional manner and forms no parts of the present invention.

The flash-cube operating mechanism will now be described in detail. Its several components are shown in the exploded view of FIG. 6 and include, in addition to the previously-described cooperating components of the driving element 58, a flat-spring element 84 having a unitary mounting-plate portion 84a at one end and an integral yoke- or cap-like element 86 at its free extremity; a generally-circular resilient metallic drive plate 88 including a central perforation 88a, a pair of curved upwardly-inclined peripheral fingers 88b, a peripheral cam portion or sector 88c, and a depending actuating pin 90; an angular mounting bracket 92 having formed therein an arcuate slot 92a and a threaded perforation 92b and including an upwardly-projecting bearing shaft or spindle 94; a bearing washer 95 positioned thereon; a pivotal arm 96 comprising a cam-follower 98 and a detent element 100; a torsion spring 102; a threaded stud 103 for insertion in perforation 92b to mount the arm 96 and the spring 102; a composite generally-circular socket element 104 including at its upper portion a standard flash-cube mounting socket 106, means providing at its bottom surface a central bore 108 for mounting the element 104 for rotation on the spindle 94, an integral ratchet-wheel 110, four peripheral locking recesses or notches 112 spaced 90° apart, four identical peripheral slightly-spaced and radially-flared cam-like sections 114 terminating at their widest portions in radial surfaces 114a to form around the periphery between the sections the aforesaid notches 112; four identical arcuate portions 116 so formed on the lower or bottom surface of the element 104 as together to provide a circular band composed of four contiguous quadrants each terminating in a generally vertical driving step 118 for undergoing engagement by the tip of one of the resilient fingers 88b of the drive plate 88 during rotation of the latter; and a pawl 120 in the form of a flat-spring having an angled extremity and attached to a separable section 12b of the housing for engaging the ratchet-wheel 110 and permitting rotation of the socket element 104 in but one direction. An apertured portion of the housing section 12b bears slidably against the circular flange 118 of the socket element 104 thus serving to hold the latter at correct functional position while permitting its rotation. When removed, it permits disassembly of the several components.

Operation of the above-described interlocking apparatus for tensioning the shutter, rotating the flash-cube, and processing each exposed film assembly, constituting one complete operational cycle, will now be considered. All of the foregoing procedures are performed by manually pulling the handle 34 to its outer limit, followed by pushing it to its inner limit, the latter position being that illustrated in FIGS. 1 and 2.

Let it initially be assumed that the condition is one for picture taking, namely, that the handle 34 is at its maximum inward position; that magazine 38 containing a full complement of the film assemblies 20 is mounted on the camera, as shown in FIG. 1, and that all is in readiness for performing a photographic exposure. This places the foremost film assembly at the focal plane, an opaque protective cover sheet first having been removed from the film pack to thus position the film assembly. To remove the cover sheet the handle 34 has been pulled out to its extreme position and returned to its maximum inward position. This procedure ejects the cover sheet and preliminarily tensions the shutter. The photographic exposure is then completed in the usual manner, the finder 14 and, for example, conventional diaphragm, shutter-release and distance-adjusting means of the camera, not shown, having been utilized for the purpose.

When the handle 34 is pulled outwardly, to the right, with the camera positioned as shown in FIG. 1, or to the left as shown in FIG. 2, the film-advancing means 16 is moved toward a location for engaging the trailing edge 20a of the mount of the foremost exposed film assembly. After the film-advancing means 16 has proceeded through a major portion of its outward travel, the surface 18c of the cross-bar 18 contacts the tang 66 of the L-shaped driving element 58. From this point on, continued outward drawing upon the handle 34 and similar movement of advancing means 16 produces an identical although shorter movement of the driving element 58 with the following results. The tang 80 drives the plunger 82 against the connecting means 85 thereby tensioning the shutter. The arm member 62, and more specifically the contact piece 62a thereof, drives the pin 90 along an arcuate path, generally to the left as shown in FIG. 2. This is permitted by the slot 92a and a slidable relation of pin 90 with the smooth surface of the contact piece 62a which allows a slight rearward and forward movement of the pin thereagainst while describing its arcuate travel. Accordingly the pin 90 carries the yoke 86 also to the left as shown in FIG. 2 thereby tensioning the driving spring 84. The spring 84 is held at its tensioned state, even though the handle is released, by frictional contact of the driving element with its guiding surfaces. Maximum arcuate travel of the pin 90 and tensioning of the spring 84 is determined by the limit of outward travel of the handle 34 established by contact of the crossbar 18 with the camera wall 19.

The above-described operations provide an actuation of the flash-cube rotational components which can best be described by reference to FIGS. 6–9. The condition of the rotational mechanism shown in FIG. 7 assumes the flash-cube unit to be located as shown in FIGS. 1 and 2, that is, with a flash-bulb positioned forwardly, and may be taken as that existing either immediately prior to or following a photographic exposure. The handle 34 is to be regarded as at its maximum inward location as indicated by the position of the tang 68. To bring about this condition the bias of the drive spring 84, as applied through cap 86 to the actuating pin 90 of the plate 88, has caused the latter to rotate 90° in a clockwise direction. A first diametrically opposite pair of the steps 118 (FIG. 9) at the under surface of the socket element 104 has thereby been engaged by the tips of the resilient fingers 88b of the metallic drive plate 88 and caused the socket element 104 to rotate 90° also. The 90° limit of rotation of the socket element 104 has been determined by the contact of detent 100, under bias provided by the torsion spring 102 bearing against the arm 96, with the limit-stop surface 114a of the flared section 114. Concurrently, the cam-follower 98 has been brought to rest against the peripheral surface of the resilient finger 88b.

In FIG. 8, it is to be assumed that the handle 34 has been drawn to its maximum outward position following a photographic exposure, as indicated by the position of the tangs 66 and 68 with respect to the slots 70 and 72, respectively. The circular drive plate 88 has been rotated in a counterclockwise direction. The cam-follower 98 has been moved outwardly, in opposition to the bias of torsion spring 102, by the cam surface 88c and rests against the latter. The socket element 104 has been held against simultaneous rotation, such as might have been caused through its frictional contact with the rotating plate 88, by the pawl 120 in engagement with the ratchet wheel 110 (FIGS. 2 and 6). The tips of the fingers 88b have been brought to a position engaging a second diametrically opposite pair of the step surfaces 118. As previously described, it is to be recalled that upon completion of the outward movement of the handle, the shutter has been tensioned and the contacting surface 18a of the cross-bar of the film-advancing means 16 has engaged the edge of a film-assembly mount at the focal plane.

Upon pushing the handle 34 inwardly, the sequence of operations is, in general, that which has already been described with respect to FIG. 7. However, it will be repeated in a more coordinated and complete form. The cross-bar surface 18a pushes the film assembly 20 from the focal plane between the pressure rolls 24 and 26 and into the processing chamber 30. A succeeding film assembly is then positioned at the focal plane. The cross-bar surface 18b, near the completion of its travel, actuates the tang 68 thus advancing the interlocking drive means 58. The shutter-tensioning means 82 is returned to its non-actuating position by the compression spring of element 83. The drive spring 84, now providing the driving force, rotates the drive plate 88 through 90° through the intermediary of the yoke 86 and actuating pin 90. The resilient fingers 88b of the drive plate engage a pair of steps 118 and produce rotation of the socket element 104 and the flash cube mounted therein. Detent 100 engages surface 114a of the socket element 104 and limits rotation of the latter to a 90° step. A new flash-bulb is thus brought to functional position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for incorporation with a camera for performing at least one function relating to the photographic exposure of a film assembly including that of producing rotation of a socket element and a flash-cube mounted therein and at least another function relating to the processing of said film assembly by a diffusion transfer method following its exposure, said apparatus comprising compression means, a processing chamber, a linearly-movable, rectangular, frame-like film-advancing element slidably mounted in guide means within said camera and extending externally through one end thereof with a manually-actuable handle attached to an outer extremity, said element including a first projecting surface located at an opposite inner extremity and identified with said film-assembly processing for engaging said film assembly to advance it from a focal plane between said compressive means and into said processing chamber and a pair of contacting surfaces for initiating, through movement of said film-advancing element, said exposure function, and linearly-movable intermediate driving means including a plurality of unitary arm and angularly-projecting tang members, a pair of which tang members is adapted to be engaged by said contacting surfaces of said film-advancing element in response to movement of the latter in opposite directions, said handle and attached film-advancing element when moved in an outward nonfilm-advancing direction, providing through the interlocking characteristic of said intermediate driving means, the tensioning of a drive spring adapted to apply driving bias to means for rotating said flash-cube.

2. Photographic apparatus, as defined in claim 1, wherein are included limit-stop means for defining the limits of back-and-forth movement of said film-advancing means and said intermediate drive means, the latter, when moved to a location provided by manually drawing said handle to its outermost extent, serving to fully tension said drive spring and releasably hold it thus tensioned through frictional contact with adjacent surfaces of said apparatus, said handle, when moved inwardly, providing an opposite movement of said intermediate drive means effecting a release of said drive spring, the latter then being enabled to assume control and actuate said means for rotating said flash-cube.

3. Photographic apparatus, as defined in claim 1, wherein said intermediate driving means is an L-shaped metallic element mounted in guide means for slidable movement in said directions but in predeterminedly shorter strokes.

4. Photographic apparatus, as defined in claim 1, wherein said drive-spring is a U-shaped flat spring fixed at one end to a bracket of the camera and having its other end freely movable and positioned to bear against a component of pivotal means for rotating said flash-cube socket element unidirectionally in steps of 90°.

5. Photographic apparatus, as defined in claim 4, wherein said means for rotating said flash-cube socket element comprise a circular drive-plate having, respectively, a central bore for mounting it for rotation and, integral with said plate, a pair of arcuate, resilient, upwardly-inclined, peripheral fingers, a peripheral cam-sector, and a depending driving pin adapted to be driven by said freely-movable end of said U-shaped spring; a mounting bracket including, respectively, an annular slot for accepting and permitting unrestricted arcuate movement of said depending pin of the drive plate, an upwardly-disposed spindle for rotatably mounting thereon said central bore of the driving plate, and a threaded perforation for accepting a stud; a bearing stud threadedly mounted in said perforation; an arm pivitally-mounted at one end on said stud and including at its outer extremity both a cam-follower for engaging said cam-sector of the drive plate and a pawl-like detent; a torsion spring for biasing said arm; a composite unitary socket element including, respectively, a central bore for rotatably mounting it on said spindle of the bracket, four identical arcuate sectors formed on its bottom surface each terminating in a step adapted to be engaged and driven by said fingers of the drive plate, during rotation of the latter, for rotating the composite socket element, four identical flared, cam-like peripheral sectors having radially-disposed limit-stop surface portions for engaging said detent, the latter being biased thereagainst by said torsion spring, a ratchet-wheel and a flash-cube socket; and retentive capping means including a central aperture for accepting said socket element and a pawl mounted thereon for engaging said ratchet-wheel to insure unidirectional rotation of said socket element.

6. Photographic apparatus, as defined in claim 1, wherein said exposure function also relates to means for tensioning a shutter, said means comprising an actuating tang member of said intermediate driving means and movable means connecting with said shutter and positioned for contact by said tank member during movement of said intermediate driving means.

References Cited

UNITED STATES PATENTS 3,350,990  11/1967  Finelli et al. _____ 95—13
3,353,468  11/1967  Beach _____ 95—11.5
3,369,469  2/1968  Downey _____ 95—13

JOHN M. HORAN, *Primary Examiner.*

R. L. MOSES, *Assistant Examiner.*

U.S. Cl. X.R.

95—11.5; 240—1.3